United States Patent [19]

Taschek

[11] 4,155,712
[45] May 22, 1979

[54] MINIATURE HYDROGEN GENERATOR

[76] Inventor: Walter G. Taschek, 1805 Warren Dr., Woodbridge, Va. 22191

[21] Appl. No.: 839,949

[22] Filed: Oct. 6, 1977

Related U.S. Application Data

[63] Continuation-in-part of Ser. No. 676,273, Apr. 12, 1976, abandoned.

[51] Int. Cl.² .............................................. B01J 7/02
[52] U.S. Cl. .................... 422/239; 423/657; 48/4
[58] Field of Search .................. 23/282, 281; 423/657; 48/4

[56] References Cited

U.S. PATENT DOCUMENTS

| | | | |
|---|---|---|---|
| 3,098,769 | 7/1963 | Liebhafsky et al. | 429/19 R |
| 3,594,232 | 7/1971 | Spahrbier | 23/282 X |
| 3,629,075 | 12/1971 | Gutbier | 203/1 |

*Primary Examiner*—James H. Tayman, Jr.
*Attorney, Agent, or Firm*—Nathan Edelberg

[57] ABSTRACT

A relatively small size apparatus for generating hydrogen by the reaction of a metal hydride with water vapor is disclosed. The metal hydride utilized to generate the hydrogen gas is housed in a fuel chamber of the apparatus and water vapor is introduced into the fuel chamber through a porous membrane having selected characteristics. The metal hydride reacts with the water vapor in a conventional manner to produce pure hydrogen. A variable gas pressure - liquid pressure balance means for introduction of water vapor enables automatic hydrogen generation on demand and enables complete shut down when demand ceases. The apparatus of this invention may be operated at any selected constant pressure feed rate. Further, with the apparatus of this invention the water source is effectively isolated from the metal hydride by the porous membrane, which has hydrophobic characteristics, and as a consequence, both contamination of the water source and caking of the metal hydride fuel is minimized. The apparatus of this invention can be utilized as a hydrogen or other gas source in many applications where a source of hydrogen or other gas is required but is ideally suited for regulated and pressure feed applications, for example, as the hydrogen source for the hydrogen electrode of the fuel cell.

2 Claims, 3 Drawing Figures

MINIATURE HYDROGEN GENERATOR

STATEMENT OF GOVERNMENT INTEREST

The invention described herein may be manufactured, used, and licensed by or for the Government for Governmental purposes without the payment to me of any royalties thereon.

COPENDING APPLICATION STATEMENT

This application is a continuation in part of my copending application Ser. No. 676,273, filed Apr. 12, 1976 now abandoned.

BACKGROUND OF THE INVENTION

This invention relates to hydrogen generators, and more particularly, to a miniature hydrogen generator.

There are many applications where a source of hydrogen is required. In field applications, the most common source of hydrogen utilized today is the well-known bottles or tanks in which the hydrogen is stored under pressure. It will be appreciated that these hydrogen tanks or bottles are generally bulky and rather heavy. Further, when a tank or bottle is exhausted it must be replaced with another tank or bottle. Storage tanks or bottles are utilized in field applications because heretofore hydrogen production facilities have been considered too large, too heavy, too expensive and in many instances, too unsafe, for portable operation. Commonly, the hydrogen is generated at a hydrogen production plant and is pumped into the tanks or bottles under pressure.

There are, of course, many different known ways of generating hydrogen. One well-known method of generating hydrogen is to react a metal hydride such as lithium hydride (Li H) with water or water vapor. When the metal hydride chemically reacts with water or water vapor, hydrogen gas is released from the hydride. It is recognized that prior art portable hydrogen generators have not been widely utilized largely due to hydride fuel caking if water is applied directly or if the amount of water vapor introduced is not adequately controlled. Further, where the metal is a Group 1A metal such as $L_1$, Na or K (as is often the case), the reaction with a liquid water often forms caustic (Lye) solutions, i.e., NaOH, KOH, LiOH which may cause various malfunctions and greatly reduce the lifetime of the portable hydrogen generator, especially in intermittent use, unattended applications. Moreover, prior art generators generally do not provide a regulated source of hydrogen in which the hydrogen can be automatically shut off and generated on demand over widely varying hydrogen demand rates with quick response to change in demand.

Several hydrogen generators are known which are intended for use in fuel cell applications but use of these prior art generators in portable applications may not be feasible in many instances. For example the hydrogen generator disclosed in U.S. Pat. No. 3,649,360 to Bloomfield is intended for use in fuel cell applications. This prior art device is a self contained system which utilizes both water and water vapor to activate the metal hydride bed to produce hydrogen gas. In this prior art device the metal hydride is subject to caking as the principal electrochemical activator is water. In this prior art device, water vapor, which is a byproduct of the fuel cell electrochemical reaction, is provided merely as a supplemental means from a gravity fed reservoir by means of a specially shaped wick, which is adapted for capillary action. It will be appreciated that with water rather than water vapor as the primary activator, relatively quick action hydrogen gas shutoff is difficult, if not impossible to attain. Moreover, the wide mouth, funnel shaped, capillary material, wick and the requisite lower level disposed reservoir greatly complicate a compact design of the generator for portable use.

As another example of the prior act, the hydrogen generator disclosed in U.S. Pat. No. 3,133,837 also utilizes water as the principal activator and utilizes an additional element, a pressure controlled pump means to automatically introduce water to the metal hydride, as required. It will be appreciated that the disadvantages of the first described prior art device are present in the latter prior art device, as well.

SUMMARY OF THE INVENTIONS

This invention provides a small portable hydrogen generator utilizing a metal hydride and water vapor in which hydrogen can be automatically produced on demand or at a constant pressure feed over widely varying hydrogen demand rates without water supply contamination or metal hydride caking complications.

BRIEF DESCRIPTION OF THE DRAWING

A full and complete understanding of the invention can be obtained from the following detailed description of the invention when read in conjunction with the annexed drawing in which.

DETAILED DESCRIPTION OF THE INVENTION

Figure 1:
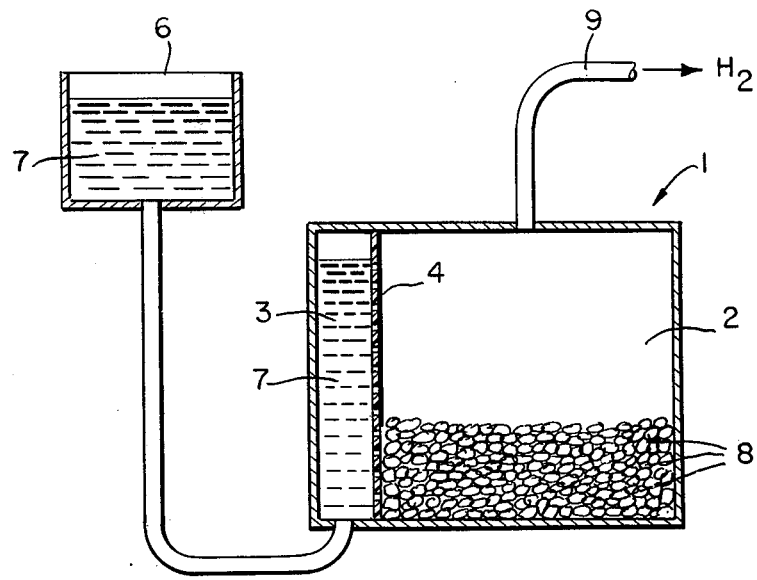
FIG. 1 shows a first embodiment of a hydrogen generator constructed in accordance with this invention.
Figure 2:
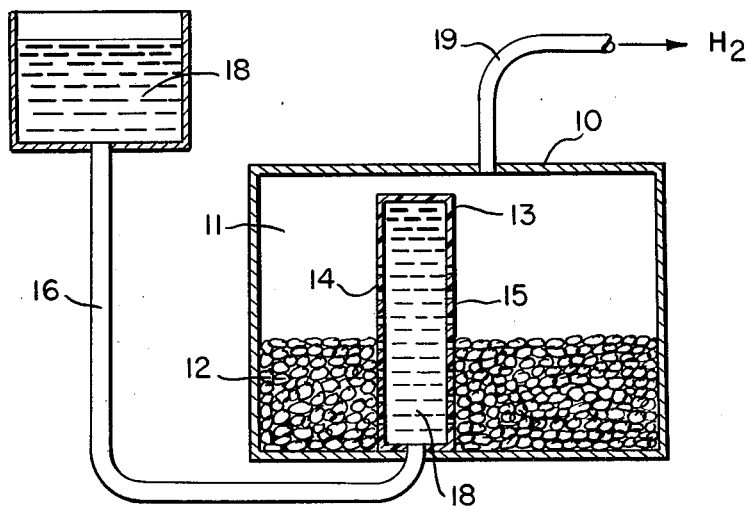
FIG. 2 shows a second embodiment of a hydrogen generator constructed in accordance with this invention.

In both disclosed embodiments, FIG. 1 and FIG. 2, a metal hydride 8 is stored in a fuel compartment 2 into which water vapor is introduced from a water compartment 3a. The water compartment 3a is separated from the fuel compartment 2 by means of a porous membrane having selected characteristics that permit water vapor but not water in liquid form, to enter the fuel compartment 2. In both embodiments the water vapor chemically reacts with the metal hydride to produce hydrogen in a conventional manner. To enable the automatic introduction of water vapor, water is stored in a first water compartment and the compartment 3a is coupled to a second water compartment 3b by means of a hollow hose 5, or the like, which readily permits water movement there through. In both embodiments, the hydrogen generated in the compartment 2 containing the metal hydride 8 may be directly transmitted by gas line to any device which utilizes hydrogen, for example, a fuel cell. Both hydrogen generators embodiments may be relatively small in size, light in weight, and may be readily transported from place to place.

Referring to the drawing, and particularly to FIG. 1, a container or housing 1 shown in cross-section in the drawing has a fuel compartment 2 and water compartments 3a and 3b. Fuel compartment 2 and water compartment 3a are separated by means of a porous hydrophobic membrane 4 which is also shown in cross-section in FIG. 1. As mentioned heretofore, the porous membrane 4 must permit passage of water vapor but must not permit passage of water, per se, in liquid form. It has been found that hydrophobic meterials which possess these pass-no pass characteristics, with a relatively low pressure differential (i.e. +0.1 psi) across the material, are commercially available with selected porosity, pore size and material thickness. For example, porous "Teflon", commercially available from Chemplast, Inc., and advertized in 1975 and later, Filteration Engineering catalogs as "Zitex" #846B122, 5 mils thickness; #E606-122, 19 mils thickness, may be utilized as the porous membrane 4 in this invention when the passage of water vapor and the nonpassage of water is the requirement in a particular gas generation application.

As a general membrane 4 consideration, porosity, is not a major material selection consideration within reasonable porosity limits. It will be appreciated that porosity increases diffusion of vapor through the membrane. Porosities of 40 to 75 percent have been found to be acceptable in some water, water vapor embodiments of this invention.

It has been found, however, that pore size affects the liquid bubble pressure characteristic and that this affects the pressure differential required to initiate flow of liquid through the membrane. In this invention, bubble pressure at least 0.1 psi is involved and higher bubble pressure is preferred. In a typical case, material with a bubble pressure characteristic over 0.5 psi might be utilized.

The thickness of the porous membrane has been found to have a relatively small effect on vapor diffusion, as well. Of course, the greater the thickness, the greater the resistance to passage of the water vapor.

Container 1 may be constructed from plastic, metal or any other suitable material that is inert to hydrogen and to the metal hydride fuel 8 which is located in fuel compartment 2. Hydrogen is withdrawn from fuel compartment 2 of container 1 by means of the hose or conduit 9 which may be constructed of like hydrogen inert material.

Likewise, the compartment 3b which serves as a reservoir in this invention may be constructed from plastic metal or other suitable material. In this case, of course, the material must not be adversely affected by the contained liquid. It will be appreciated hereinafter that the volume of the liquid and the disposition of the compartment 3b relative to the container 1 provides a head pressure factor which is utilized when balanced against the increased gas pressure in compartments 2 and 3a when gas demand ceases to move the liquid out of the compartment 3a. This head pressure will decline as the volume of the liquid declines with vapor utilization in the metal hydride gas generation reaction. To replenish the volume of liquid in the liquid reservoir compartment 3b it may be desirable in some applications to provide a level controlled liquid input means as indicated at 6. Obviously, almost any level control means, such as found in a bathroom commode water closet, may be utilized for this liquid replenishing purpose. For purposes of simplicity in the drawing, the level control means is illustrated in block diagram form at 6a.

Metal hydride fuel 8 can be any suitable metal hydride that freely gives off pure hydrogen ($H_2$) when exposed to water ($H_2O$) - vapor. Two suitable metal hydrides are calcium hydride ($CaH_2$) and Lithium aluminum hydride ($LiAlH_4$). The reactions of these two metal hydrides with water are as follows:

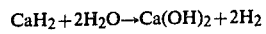

$$CaH_2 + 2H_2O \rightarrow Ca(OH)_2 + 2H_2$$

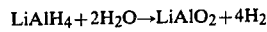

$$LiAlH_4 + 2H_2O \rightarrow LiAlO_2 + 4H_2$$

If excess water is present (as in most prior art generators) the reaction is

$$LiAlH_4 + 4H_2O \; LiOH + Al(OH)_3 + 4H_2$$

It will be noted that water disposal requirements are doubled if excess water is present. Moreover, it has been found that $Ca(OH)_2$ is not very soluble, but forms a paste with excess water. Obviously, excess water in the gas generation phase is highly undesirable. The present invention which relies solely on water vapor for the metal hydride reaction minimizes the potential for excess water problems.

From the foregoing reaction equations it is apparent that calcium hydride and lithium aluminum hydride both give off pure hydrogen when these hydrides react with water vapor.

As previously mentioned, water 7 flows from water storage compartment 3b into water compartment 3a by means of hose or conduit 5, as long as pressure inside fuel compartment 2 is less than the pressure in water compartment 3a. Water in the form of vapor will flow from water compartment 3a into fuel compartment 2 at a rate proportional to the liquid water level in water compartment 3a. This water vapor will react with the metal hydride fuel 8 and hydrogen ($H_2$) will be generated. The generated hydrogen will flow out of fuel compartment 2 through the hose or conduit 9.

The other end of hose or conduit 9 will normally be connected to a device not shown in FIG. 1, that utilizes the hydrogen generated in fuel compartment 2. For example, as previously stated, hose or conduit 9 may be connected to a hydrogen utilizing fuel cell device.

For purpose of operational discussion, it is assumed that hose on conduit 9 is connected to a conventional hydrogen utilizing device, not shown in FIG. 1, that requires hydrogen on an intermittent or noncontinuous basis.

If the hydrogen utilization device suddenly demands more hydrogen, the gas pressure in both the compartment 2, and the compartment 3a, which is substantially equal to start, will drop, with the greatest drop occurring first in compartment 2, causing the water in the water compartment 3b to flow into compartment 3a to compensate for the gas pressure differential. As water indicated at 7, flows into compartment 3a, more of the porous membrane 4 surface will be exposed to water as the water rises in compartment 3a increasing the diffusion of water vapor into the fuel chamber 2, thereby increasing the water vapor-metal hydride reaction and, thus, the hydrogen production rate. Typically, it has been found, there is a slight delay between hydrogen demand and production—resulting in an excess production rate for a short period, i.e., until the pressure and water level stabilize for the increased rate. The same pattern follows in reverse for a drop in hydrogen demand. There is no excess production, of course, in the case of a drop in demand.

When the hydrogen utilization device goes into a nonconsuming mode, the gas pressure in compartment 2 and in compartment 3a will increase forcing water completely out of the compartment 3a. When water leaves the compartment 3a, hydrogen production decreases rapidly to a relatively low rate, then slowly tapers down until production virtually ceases. It has been found that the hydrogen normally stored in the utilization device input, the hose compartment 2 and at least a portion of compartment 3a provide an ample reserve to supply the hydrogen consuming device when demand suddenly increases until the hydrogen generation reaction is reestablished by entry of water in compartment 3a and consequent water level proportional entry of water vapor in compartment 2 occurs.

In the normal shut down condition, the pressure in the fuel compartment 2, and the fuel supply line 9 will approach the pressure in water compartment 3b and the pressure exerted by the difference in the level of water in the water compartment 3b and water compartment 3a.

or $$P_2 = P_9 = P_{3b} + (h_{3b} - h_{3a})K$$

where K is an appropriate factor to convert head of water to pressure units used, and h is the height of the water level in each water compartment.

In addition to providing hydrogen on demand the apparatus of FIGS. 1 and 2 can provide hydrogen at a constant feed rate. The hydrogen utilization device may be one in which the pressure in the hydrogen receiver is or can be maintained relatively constant, above or below atmospheric pressure. In this case, fuel chamber 2 is connected to a constant pressure receiver through hose or conduit 9. The water level in the water compartment 3a is adjusted to provide a constant flow of water vapor into the fuel chamber 2 and consequently, hydrogen is supplied to the hydrogen utilization device at a constant feed rate. Even if the pressure in the hydrogen utilization device does not remain constant, hydrogen can be supplied at a constant rate if the utilization device uses the hydrogen as it is supplied from the generator. That is, the pressure in fuel compartment 2 and water compartment 3a is permitted to adjust to compensate for pressure fluctuation in the hydrogen utilization device so that hydrogen is withdrawn at the desired rate.

While housing or casing 1 is shown as a one piece structure with openings for receiving the hoses or conduits 5 and 9, it should be obvious that housing 1 can be provided with a hinged opening. The top or bottom or one of the sides could be hinged with appropriate latching means so that one can readily gain access to the inside of casing 1 to replace the metal hydride fuel 8 when it is spent and to clean the fuel compartment. Instead of a hinged door, a large hole with an appropriate removable closure means could be provided. In addition, housing or casing 1 can be fabricated to have any shape, cylindrical, square, rectangular or irregular. Also, water compartment 3a could completely surround fuel compartment 3 or could partially surround fuel compartment 2 or can just be formed along one side as shown in FIG. 1. All these variations are noted to emphasize that the hydrogen generator of FIG. 1 is not limited to any specific physical shape.

Referring now to FIG. 2, a second specific embodiment of the invention is shown which is merely a variation of the embodiment of FIG. 1. In this embodiment, the housing or casing 10, which is shown in cross-section, forms the fuel compartment 2 in which the metal hydride fuel 8 is stored. As in the FIG. 1 embodiment, the fuel 8 is a suitable metal hydride such as CaH$_2$ or LiAlH$_4$. A closed end tubular member 13 is placed in fuel compartment 11 such that tubular member 13 is essentially located in the middle of fuel compartment 2 with fuel 8 surrounding tubular member 13. If tubular member 13 is rectangular in cross-section the four side walls or a part of each of the four side walls may be formed from a porous hydrophobic membrane material such as the membrane 4 material in FIG. 1. While, as shown, the membrane 4 does not extend the full length of the side walls of tubular member 13 in FIG. 2, the entire length of the walls could be formed from the membrane 4 material or selected side wall membrane sections could be shorter in length than others, if desired. Similarly, if tubular member 13 is cylindrical in cross-section, the tubular member could be formed from a cylindrical shaped membrane with an end cap inserted into one end of the cylinder to form an end closed water compartment or a shorter cylindrical section of the membrane material could be provided and the cylinder lengthened with a cylindrical section of an impervious material secured to at least one end of the cylindrical section of membrane material, and with an end cap to close one end of the cylinder. A hole is provided in the bottom of casing 10 which connects to the bottom of tubular member 13. A hose or conduit 5 has one end inserted into tubular member 13 through the hole provided in casing 10. The other end of hose or conduit 5 is connected to water compartment 3b which contains water, indicated at 7. Water flows out of water compartment 3b into tubular member 13 through hose or conduit 5. The hydrogen generated in fuel compartment 2 is withdrawn from fuel compartment 2 by means of the hose or conduit 9 which is inserted into compartment 2 through an opening provided in casing or housing 10. Note that instead of providing holes for hoses or conduits 5 and 9, a connector is preferably formed in casing 10 to accommodate hose or conduit 9 and a coupling arrangement is preferably provided in tubular member 13 and casing 10 to accommodate hose or conduit 5. In this manner, water tight and hydrogen tight couplings of hoses or conduits 5 and 9, respectively, can be more easily provided. Similarly, such couplings would be provided in the embodiment of FIG. 1 to couple hoses or conduits 5 and 9 to water compartment 3a and fuel compartment 2, respectively.

The hydrogen generator of FIG. 2 operates in the same manner that the hydrogen generator of FIG. 1 operates. That is, water in the form of water vapor enters fuel compartment 2 through the membrane or membranes in FIG. 2, provided in tubular member 13 and reacts with the metal hydride fuel 8 to form pure hydrogen (H$_2$). As was discussed above with reference to FIG. 1, the hydrogen generator of FIG. 2 can also provide hydrogen on demand or provide hydrogen at a constant pressure rate. The operation of the hydrogen generator of FIG. 2 is identical to the operation of the hydrogen generator of FIG. 1 as described above with respect to providing hydrogen on demand or at a constant rate. Also, as is the case with casing or housing 1 of the embodiment of FIG. 1, casing or housing 10 and tubular member 13 can be rectangular, square, circular or irregular in cross-section and a hinged door or large opening with a plug can be provided in casing 10 to replenish fuel 8 and to clean the apparatus. Further, while conduit or hose 5 is shown as being connected to the bottom of tubular member 13 in FIG. 2, it could be connected to the top of tubular member 13. Similarly, hose or conduit 5 of FIG. 1 can be connected to the top of water compartment 3a rather than the bottom as shown in FIG. 1. Also, hose or conduit 9 in FIGS. 1 and 2 can communicate with fuel chamber 2 at any point. The apparatus of FIGS. 1 and 2 can each be fabricated as a small light weight package with all the components, including the hydrogen utilization device, housed in a single container or package. Under such conditions, the hoses or conduits, 5 and 9 could be and normally would be replaced by couplers or connectors as should be obvious. Thus, while the elements 5 and 9 of FIGS. 1 and 2 have been defined above as hoses or conduits, these elements are to be considered in the broader sense as being any type of suitable coupling arrangement that provides communication between the water storage compartment and the water compartment adjacent the fuel compartment and between the fuel compartment and the hydrogen utilization device.

Figure 3:
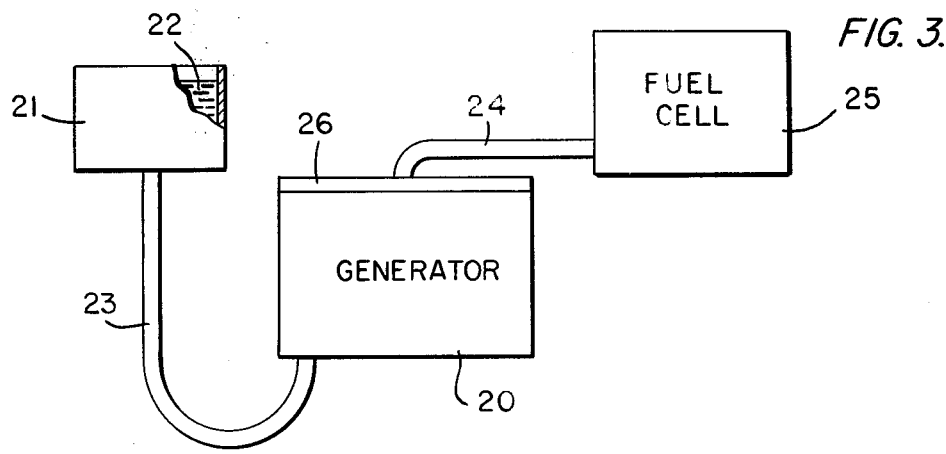
FIG. 3 shows a fuel cell and a hydrogen generator of this invention coupled to the fuel cell.

Referring to FIG. 3, FIG. 3 is presented to show a typical use of a hydrogen generator of this invention. As shown in FIG. 3, the hydrogen generator comprises a housing or casing 20 in which hydrogen is generated by the reaction of water vapor with a metal hydride fuel as described above with reference to FIGS. 1 and 2. Housing 20 can be either housing 10 of FIG. 2 or housing 1 of FIG. 1. A removable sealed lid 26 is provided in the top of housing 20. The water 22 stored in water compartment 3b is transmitted to the water compartment 3a in housing 20 by means of the hose or conduit 5. The hydrogen generated in the fuel compartment of housing 20 is transmitted to the hydrogen electrode or a fuel cell 25. The entire apparatus of FIG. 3 can be fabricated as a small package to form a small light weight portable DC power supply. As mentioned above, if the apparatus of FIG. 3 were fabricated as a small package, elements 23 and 24 would be short conventional couplers. Of course, elements 23 and 24 could also be very short sections of hose or conduit. The DC voltage supplied by the fuel cell 25 can be used with, for example, airport runway lights, warning light systems along highway construction and the like or wherever a low voltage DC supply is needed.

While the invention has been described with reference to two specific embodiments illustrated in FIGS. 1 and 2, it will be obvious to those skilled in the art that various changes and modifications, in addition to those specifically mentioned, can be made to the two embodiments described and shown without departing from the spirit and scope of the invention as set forth in the claims.

For example, the principles outlined above with respect to a water activated metal hydride generator can be extended to other systems where the principle reactants are a non water liquid and an appropriate chemically reactive material which produces another gas when combined with a vapor. The liquid may also be a mixture or solution. It will be appreciated that all liquids, to different degrees, exhibit a vapor pressure which would allow transpiration of the vapor through the porous membrane while holding the liquid. (1) For example, a salt solution would allow water vapor through but hold the salt and liquid water back; (2) if calcium carbide is the fuel the device could be used to control acetylene production; or (3) the liquid could be Bromine and the device used to control reaction of some desired component.

What is claimed is:

1. An automatic, demand responsive gas generator for producing gas by chemical reaction of a solid fuel upon controlled exposure to a liquid vapor, said generator comprising:
   a compartment for storing solid fuel;
   a first compartment adapted to contain a liquid such as water;
   a wall common to said fuel compartment and said liquid compartment, said wall including a porous hydrophobic membrane of Teflon material of a selected wall thickness adapted to pass gaseous and vaporous mediums and
   to restrict free passage of said liquid;
   a second compartment adapted to contain a second portion of said liquid;
   a hollow tubular means interconnecting said first and second liquid compartments;
   said second liquid compartment being disposed above said first liquid compartment such that the mass of liquid in said second compartment exerts a head pressure on said first liquid compartment; and
   a gas outlet connected to said fuel compartment for conducting produced gas to a gas utilization means whereby the gas utilization causes a decrease in gas pressure in the fuel compartment and the first liquid compartment which causes liquid to flow from said second liquid compartment into said first liquid compartment and increases the liquid vapor diffusion into the fuel compartment thereby increasing the gas production rate.

2. An automatic, demand responsive, gas generator as defined in claim 1 wherein said selected wall thickness of said porous membrane is in the general 5 to 19 mils region and the bubble pressure characteristic of the porous membrane material is at least 0.1 psi.

* * * * *